United States Patent
Gerber (10) Patent No.: US 9,032,405 B2
(45) Date of Patent: May 12, 2015

(54) SYSTEMS AND METHOD FOR ASSIGNING EXECUTABLE FUNCTIONS TO AVAILABLE PROCESSORS IN A MULTIPROCESSING ENVIRONMENT

(75) Inventor: Andrew Gerber, Fredericton (CA)

(73) Assignee: University of New Brunswick, Fredericton, New Brunswick (CA)

(*) Notice: Subject to any disclaimer, the term of this patent is extended or adjusted under 35 U.S.C. 154(b) by 95 days.

(21) Appl. No.: 13/976,321

(22) PCT Filed: Dec. 23, 2011

(86) PCT No.: PCT/CA2011/001399
§ 371 (c)(1),
(2), (4) Date: Aug. 21, 2013

(87) PCT Pub. No.: WO2012/088589
PCT Pub. Date: Jul. 5, 2012

(65) Prior Publication Data
US 2014/0149716 A1    May 29, 2014

Related U.S. Application Data

(60) Provisional application No. 61/427,888, filed on Dec. 29, 2010.

(51) Int. Cl.
G06F 9/38    (2006.01)
G06F 9/50    (2006.01)

(52) U.S. Cl.
CPC ............ G06F 9/3885 (2013.01); G06F 9/5066 (2013.01)

(58) Field of Classification Search
CPC combination set(s) only.
See application file for complete search history.

(56) References Cited

U.S. PATENT DOCUMENTS

| | | | |
|---|---|---|---|
| 5,237,691 A | 8/1993 | Robinson et al. | |
| 2006/0112396 A1* | 5/2006 | Reich et al. | 719/313 |
| 2009/0307660 A1 | 12/2009 | Srinivasan | |
| 2010/0199257 A1 | 8/2010 | Biggerstaff | |
| 2010/0257538 A1* | 10/2010 | Zhao et al. | 718/106 |

OTHER PUBLICATIONS

"Ultra-fast CFD for turbomachines", Turbostream 2.0, www.turbostream-cfd.com/technology/ (accessed Aug. 1, 2013).
Palix Technologies—Solutions for Computational analysis and design, "Palix launches ANDsolver beta program" Mar. 23, 2010, www.palixtech.com/page6/page6.html (last access Aug. 1, 2013).
Tobias Brandvik and Graham Pullan; 2010 IEEE 10th International conference on computer and Information Technology, "SBLOCK: A Framework for Efficient Stencil-Based PDE Solvers on Multi-core Platforms" pp. 1-8, 2010.

(Continued)

*Primary Examiner* — Eric C Wai
(74) *Attorney, Agent, or Firm* — Eugene F. Derényi; Fogler, Rubinoff LLP (57) ABSTRACT

A computer implemented method for assigning executable functions to available processors in a Multiprocessor environment comprising (as an example of a collection of different processing architectures) one or more CPUs and one or more GPUs, the method comprising: providing an input source comprising instructions and data; breaking the input source into data oriented cell and interface objects with processing attributes; assigning the cell and interface objects to one or more of the GPUs and CPUs based on processing attributes and the multiprocessor environment; and producing output data.

7 Claims, 8 Drawing Sheets

(56) References Cited

OTHER PUBLICATIONS

Everett H. Phillips and Massimiliano Fatica; Implementing the Himeno Benchmark with CUDA on GPU Clusters—NVIDIA Corporation Santa Clara, California; ; 2010 IEEE.

Krste Asanovic et. al; "The Landscape of Parallel Computing Research: A View from Berkeley" Electrical Engineering and Computer Sciences; University of California at Berkeley; Technical Report No. UCB/EECS-2006-183 www.eecs.berkeley.edu/Pubs/TechRpts/2006/EECS-2006-183.html; Dec. 18, 2006 pp. 1-54.

Julien C. Thibault and Inanc Senocak; "CUDA Implementation of a Navier-Stokes Solver on Multi-GPU Desktop Platforms for Incompressible Flows" 47th AIAA Aerospace Sciences Meeting Including The New Horizons Forum and Aerospace Exposition, Jan. 5-8, 2009, Orlando, Florida; pp. 1-15.

Goddeke et al; "Using GPUs to Improve Multigrid Solver Performance on a Cluster"—Int. J. Computational Science and Engineering, vol. x, Nos. a/b/c, pp. 1-20, 2008.

Elsen et al.; "Large calculation of the flow over a hypersonic vehicle using a GPU"—Journal of Computational Physics 227 (2008) 10148-10161.

Kampolis et al.; "CFD-based analysis and two-level aerodynamic optimization on graphics processing units"; Comput. Methods Appl. Mech. Engrg. (2010), vol. 199, 712-722.

Shuai Che et al. "A performance study of general-purpose applications on graphics processors using CUDA"—J. Parallel Distrib. Comput. (2008), vol. 68, 1370-1380.

Thomas Hauser and Raymond LeBeau; "Optimization of a Computational Fluid Dynamics Code for the Memory Hierarchy: A Case Study"—The International Journal of High Performance Computing Applications, Fall 2010, vol. 24, No. 3, pp. 299-318.

Tomov et al. "Towards dense linear algebra for hybrid GPU accelerated manycore systems" Parallel Computing, Elsevier—pp. 1-9, 2010.

Antoniou et al., "Acceleration of a Finite-Difference WENO Scheme for Large-Scale Simulations on Many-Core Architectures" American Institute of Aeronautics and Astronautics Paper 2010-0525—pp. 1-12.

Tobias Brandvik and Graham Pullan; "An Accelerated 3D Navier-Stokes Solver for Flows in Turbomachines", Proceedings of GT2009 ASME Turbo Expo 2009: Power for Land, Sea and Air Jun. 8-12, 2009—pp. 1-11.

Tobias et al. Turbostream Documentation Release 2.0; Nov. 25, 2010—pp. i, ii and 1-53.

"Palix Technologies, Solutions for computational analysis and design"; webpage copyright 2010 www.palixtech.com/ (accessed Dec. 7, 2010).

"Palix Technologies, Solutions for computational analysis and design"; webpage copyright 2010 www.palixtech.com/page2/ANDSolver.html(accessed Dec. 7, 2010).

"Advanced Numerical Design Solver: ANDSolver"; Whitepaper, May 2010; Palix Technologies LLC; www.palixtech.com, pp. 1-7.

"ANDSolver beta program, CFD on your GPUs", webpages 1-3, insidehpc.com/2010/03/26/andsolver-beta-program-cfd-on-your-gpus/; accessed Dec. 7, 2010.

"Turbostream Solver", webpages 1-2. www.turbostream-cfd/cp,/solver.html; accessed Dec. 7, 2010.

\* cited by examiner

SYSTEMS AND METHOD FOR ASSIGNING EXECUTABLE FUNCTIONS TO AVAILABLE PROCESSORS IN A MULTIPROCESSING ENVIRONMENT

CROSS-REFERENCE TO RELATED APPLICATIONS

This application claims the benefit of U.S. Provisional Patent Application No. 61/427,888 filed Dec. 29, 2010, which is incorporated herein by reference in its entirety.

BACKGROUND

Concerns primarily related to processor heat generation and total system power consumption are pushing computing towards a time when a very large (or massive) number of processors will be available, at increasingly lower (commodity) pricing, for solving demanding engineering and scientific computational problems. Much of this new processing power will become available on desktop computer systems and smaller, but also through the expansion of high-speed networks accessing distributed multiprocessor resources. The processors are also evolving toward a manycore design with architectures emphasizing different memory access and parallelization strategies and employing hundreds to thousands of core on a single processor. The new processors will be more energy efficient but performance will be limited by data transfer rates between processor and memory. Therefore, future Computer Aided Analysis (CAA) applications are to be designed for massive parallelism and to minimize key bottlenecks that limit performance.

In view of the above, new CAA applications must be designed to flexibly accommodate the on-going evolution of architectures towards a manycore processor environment. This includes new initiatives that complement or replace today's multiprocessing environments that emphasize multi-core central processing units (CPUs) and manycore graphics processing units (GPUs). The CAA system must then recognize the type of architectures available in the manycore (or equivalently multiprocessor) environment and deploy the CAA computational tasks appropriately for optimal performance. Furthermore, such CAA applications must also allow for a distributed multiprocessing environment where each distributed resource may have a unique manycore layout. Computing performance will depend greatly on maximizing data transfer rates to the manycore processors, and for peak performance CAA applications must, through their design, retain data organization in a manner to promote high data throughput.

SUMMARY

In one aspect, the present invention relates to a computer implemented method for assigning executable functions to available processors in a multiprocessing environment comprising (as an example of a collection of different processing architectures) one or more CPUs and one or more GPUs, the method comprising: providing an input source comprising instructions and data; breaking the input source into data oriented cell and interface objects with processing attributes; assigning the cell and interface objects to one or more of the GPUs and CPUs based on processing attributes and the multiprocessing environment; and producing output data.

DETAILED DESCRIPTION OF DRAWINGS

A method and system according to at least one aspect of the present invention accommodates the manycore computing trends discussed above for CAA applications. Furthermore the CAA system allows for a specific problem to be mapped, via a task graph, to the available multiprocessor environment in a manner that respects the complexity of data organization and communication required for engineering and scientific problem analysis. With a known multiprocessor environment this mapping employs zone, cell, interface and task objects, with related attributes, to guide the initial creation of the task graph, and its subsequent adjustment with solution monitoring. Methods and systems of the invention can, in one or more embodiments, be used to solve CAA applications involving Computational Fluid Dynamics.

In another aspect, the present invention relates to a software system and method for Computer Aided Analysis (CAA) that flexibly accommodates: i) the increasing incorporation of manycore processors on desktop and smaller computer systems, and on multiprocessor systems connected by high-speed networks, ii) the on-going evolution toward manycore processor architectures over which the CAA will be deployed, iii) data structures most suited for maximizing data transfer rates between memory and the multiprocessors employed. The system and method further accommodate the diversity of computational approaches in CAA through use of fundamental entities called cell objects, which are collected into zones and connected via interface objects. Flexibility cells and interfaces have related task objects and collectively, with interrogation of the multiprocessing environment, are used in defining a problem specific task graph. A mapping module to guide the initial instantiation of the task graph sent to the multiprocessing environment, and subsequently monitoring and modification of the task graph with the on-going solution, utilizes the same object entities. The demonstration of a cell based CAA software system and method for a specific problem is described through a Computational Fluid Dynamics example.

Figure 1:
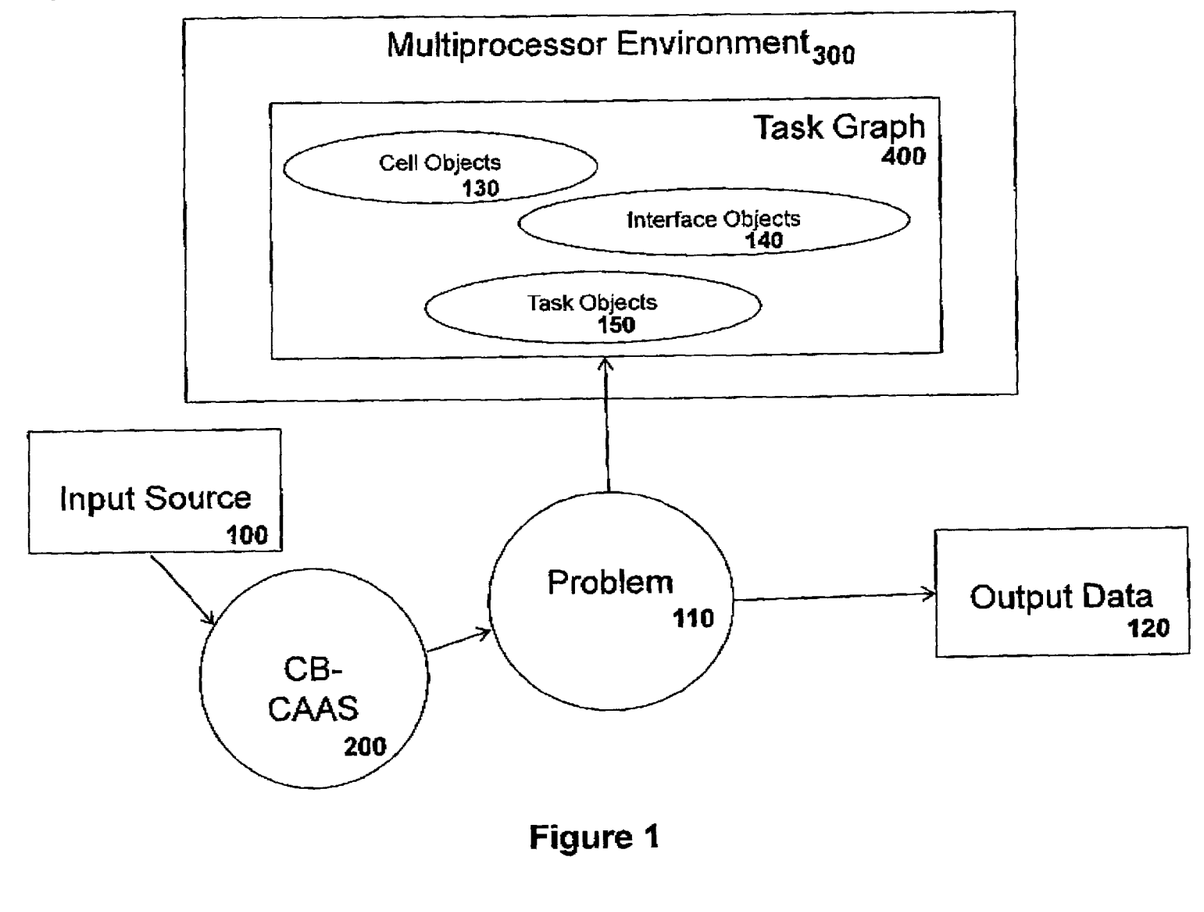
FIG. 1 depicts relationships between the Multiprocessor Environment 300 and a Cell Based-Computer Aided Analysis System 200 (CB-CAAS) solving a unique Problem 110 with its related Input Source 100 and Output Data 120 according to one embodiment of the present invention.

Referring initially to FIG. 1, in one embodiment of the present invention, there is provided Input Source 100, comprising instructions and data, plus a Cell Based Computer Aided Analysis System 200, or more compactly CB-CAAS, that uses the input instructions and data to define a unique Problem 110 to be solved. The Problem is to be solved on a Multiprocessing Environment 300 which can be comprised of processors (including groups of processors) available on a single shared memory environment 870 or processors (including groups of processors) distributed over similar or different shared memory environment or systems. Processors are comprised of multi-core and manycore computing resources, such as but not limited to, a single or multi-core central processing unit (CPU) and/or a manycore single or multi-graphics processing unit (GPU). In addition, also considered are new convergent manycore processor architectures that combine aspects of both CPU and GPU along with new hardware features. The end result of using the Multiprocessing Environment is Output Data 120 for the Problem.

How the Multiprocessing Environment 300 is utilized to solve the Problem 110 is defined by a Task Graph 400, which is created by a CB-CAAS 200 in conjunction with the Input Source 100 and knowledge of the available computing resources (obtained by system Interrogation 930) and its usage in solving a Problem (obtained by Monitoring 940). The Task Graph comprises data oriented Cell Objects 130, data oriented Interface Objects 140, and computer instruction oriented Task Objects 150, of which there can be any number of these Objects. The Task Object comprises computer instructions that operate on the data in Cell and Interface Objects. Task Objects operating on data in Interface Objects control communication between Cell Objects. The Task Graph will be described in detail subsequently herein with reference to FIG. 5.

In subsequent descriptions herein, the Cell 130, Interface 140 and Task 150 Objects will be associated with specific memory and processor resources in the Multiprocessor Environment 300. Such associations imply the use of multiple threads of execution in a computer program) to solve concurrently parts of the Problem 110. The number of threads employed depends on the processor architecture and the Cell and Interface Object details given by Attributes 170 to be described subsequently herein.

Figure 2:
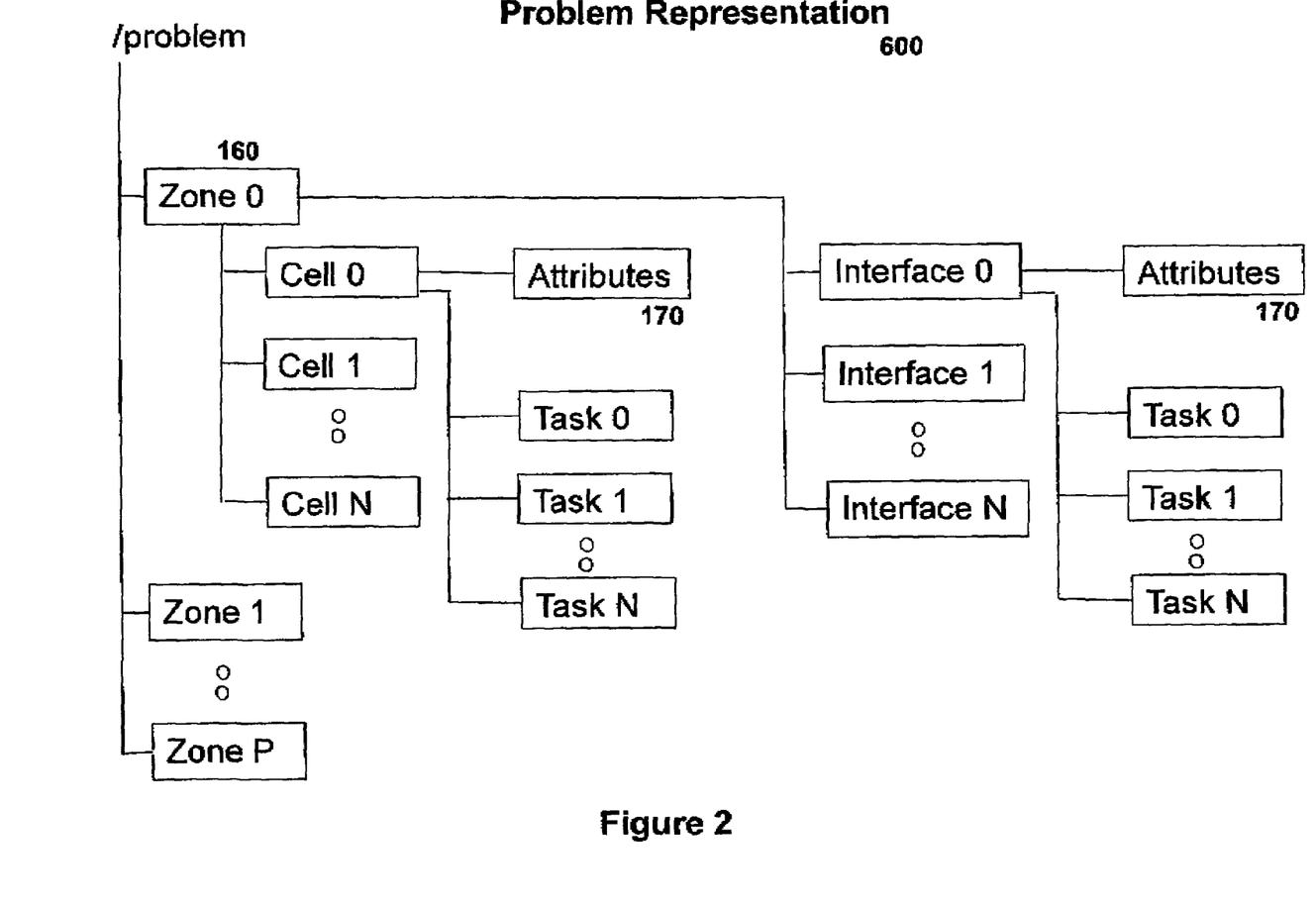
FIG. 2 depicts the unique Problem Representation 600 in terms of Zones 160, Cells 130, Interfaces 140 and Tasks 150 Objects with related Attributes 170 according to one embodiment of the present invention.

Obtaining optimal usage of the Multiprocessing Environment 300 in obtaining the Output Data 120 requires organizing the Input Source 100, using the CB-CAAS 200, into a Problem Representation 600 as shown in FIG. 2. The Problem Representation 600 defines the relationships between Cell Objects 130, Interface Objects 140 and Task Objects 150 all of which is used, in conjunction with information on the Multiprocessing Environment, in the creation of the Task Graph 400. The Problem Representation in FIG. 2 can be modified by the CB-CAAS 200 while solving the Problem 110 in order to improve solution performance. On what basis a modification is made is discussed subsequently herein.

Referring again to FIG. 2, The Problem Representation 600 utilizes a directory structure to relate Task Objects 150 to specific Cell Objects 130 and Interface Objects 140, and describes what computer instructions will operate on what data in the Multiprocessing Environment 300. A Zone 160 defines a collection of Cell Objects, Interface Objects and Task Objects that operate within a common shared memory subset of the Multiprocessing Environment. There can be any number of Zones over which the Cells, Interfaces and Tasks are distributed. For each of the Cell Objects and Interfaces Objects there are Attributes 170 assigned. The Attributes are employed in deciding what resources from the Multiprocessing Environment are used when Tasks Objects process data in related Cell and Interface Objects. The sequential ordering of the Zones, Cells, Interfaces and Tasks within a directory, as depicted in the FIG. 2, is not required.

Figure 3:
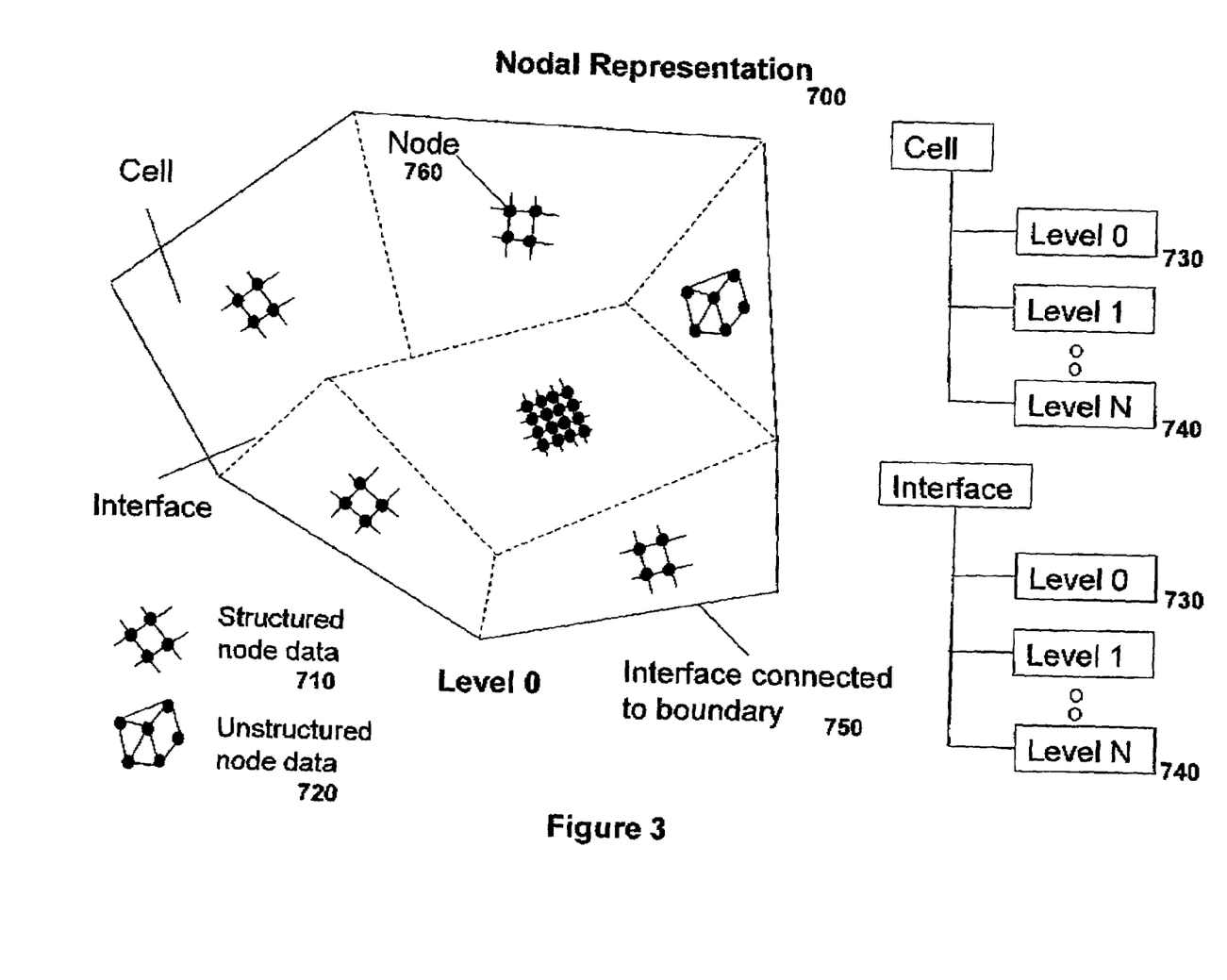
FIG. 3 depicts a Node Based Representation 700 of data organized over many Levels 730/740 into Cell 130 and Interface 140 Objects according to one embodiment of the present invention.

Taken together, Cell Objects 130 and Interface Objects 140 represent a collection of Nodes 760 over which a Problem 110 is to be solved. FIG. 3 gives a Nodal Representation 700 where Nodes are distributed over Cell Objects, shown as (but not limited to) a two dimensional region in space, and Interface Objects, also shown as (but not limited to) common edges. Nodes can have any number of data items assigned to them, as for example three data items representing Cartesian coordinates (x,y,z). The data items can also be used to create new data by weighted interpolation between Nodes. The Nodes in a Cell Object can collectively represent a volume region in space, with bounding common surfaces (between Cells) identifying the location of Interface Objects. Likewise the Nodes can collectively represent a surface region in space, with bounding common edges (between Cells) identifying the location of Interface Objects. Furthermore, the Nodes can collectively represent a line in space, with bounding common points identifying the location of Interface Objects. It is also possible that Cell Objects in the Nodal Representation of a Problem use combinations of volume, surface and line Node organizations, where the Interface and related Task Objects handle changes in Node organization between Cells.

The data items within a Cell Object 130 need not be used to represent regions in physical space. A single Node 760 to any number of Nodes may exist within Cell Objects, with each Node allowing a collection of data items as described earlier. In such cases Interface Objects 140 and related Task Objects 150 handle interactions between Cell Objects with different Node 760 organization as needed. Also, Cell and related Task Objects may be duplicated to create new Cell and Task Objects operating in the same shared memory environment 870 with some or all Nodal data items maintained in common. Likewise Interface and related Task Objects may be duplicated to create new interface and Task Objects, operating in the same shared memory environment 870, with some or all Nodal data items maintained in common.

As earlier implied in FIG. 2 any number of Cell Objects 130 and Interface Objects 140 may be present in a Nodal Representation 700. The data oriented Cell Objects may have different organizing approaches for the Nodes 760 (and assigned data items), and the Interface and related Task Objects 150 accommodate differences between Cells. The Interface Objects always have Nodes organized in an unstructured manner in order to accommodate differences between Cells. For example FIG. 3 shows Cells that have a structured 710 or unstructured 720 Nodal organizations, where structured implies data located adjacent in physical memory and unstructured otherwise. Therefore any common Interface (or edge in FIG. 3) must (flexibly) accommodate changes between Cells through an unstructured data organization. Some Cell Objects employ Interface Objects for connection to boundaries 750 which involve no adjacent Cell Objects. The Nodal Representation 700 may have a number of refinement levels, the first being Level 0 730 and represents that derived directly from the Input Source 100. Additional Levels 740 can be derived from Level 0, or the Input Source 100, and are stored with the Cell and Interface Objects as shown in FIG. 3 and is an extension to the Problem Representation 600 directory structure shown in FIG. 2. The mesh Levels 730/740 can be employed by CB-CAAS 200 in solving certain application Problems 110.

Figure 4:
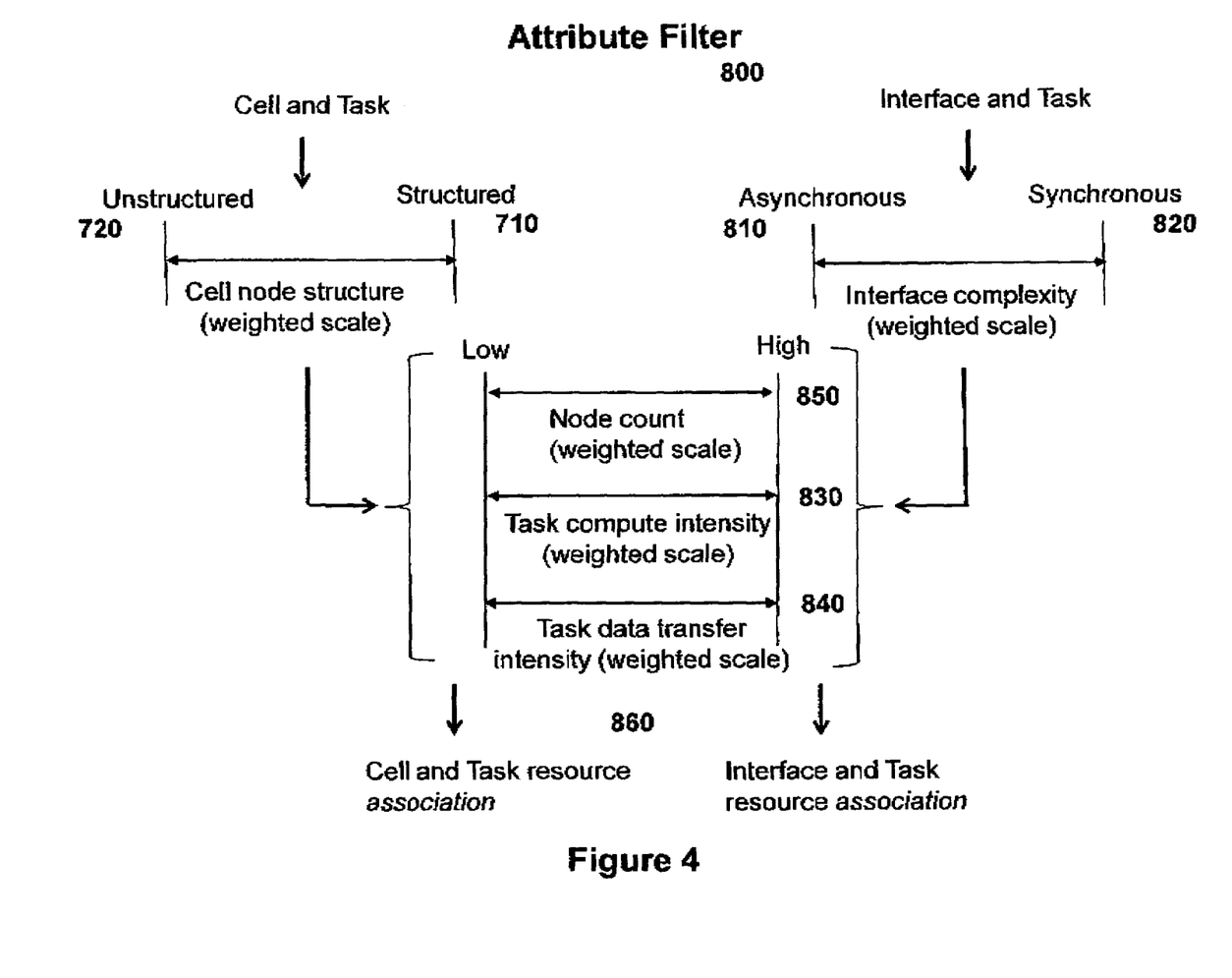
FIG. 4 depicts a broad use of Attributes 170 in the association 860 of Cell 130, Interface 140 and Task 150 Objects to available processor resources according to one embodiment of the present invention.

FIG. 4 extends FIG. 3 by elaborating on the role of Attributes 170. Attributes describe Cell 130 and Interface 140 Objects and are important in the association of these Objects, and their related Task Objects 150, to resources in the Multiprocessing Environment 300. This association is also involved in the creation or modification of the Task Graph 400. As depicted in FIG. 4, Attributes 170 are applied in a filtered manner, as for example, where Cell Objects 130 and related Task Objects 150 are first assessed, in a weighted manner, for data item organization (structured 710 versus unstructured 720), followed by Task computational 830 and data transfer 840 intensity. These intensities are also dependent on the Node Count 850, which can also be expressed as the total number of Nodes contained in a Cell Object. Similarly Interface Objects 140 with related Task Objects 150 are assessed, in a weighted manner, for complexity of communication between Cells (synchronous 820 versus asynchronous 810) followed by Task computational 830 and data transfer intensity 840 (also dependent on the Node Count 850 in the Interface Object). In either case the Cell 130 and Interface 140 Objects, and related Task Objects 150, are associated 860 to a specific a resource in the Multiprocessing Environment.

Figure 5:
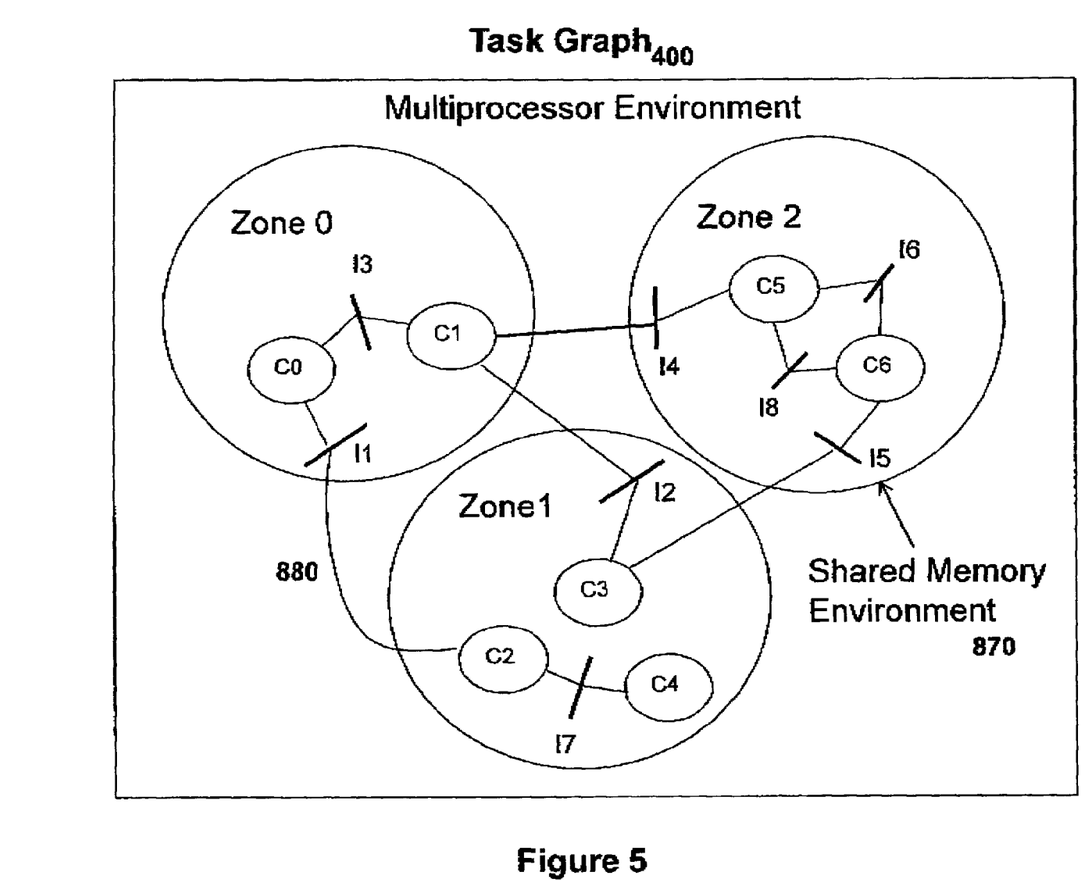
FIG. 5 depicts a Task Graph 400 with communication paths 880, using the organization of Cell 130 and Interface 140 Objects into Zones 160 for distribution over shared memory multiprocessor systems making up a Multiprocessing Environment 300 according to one embodiment of the present invention.
Figure 6:
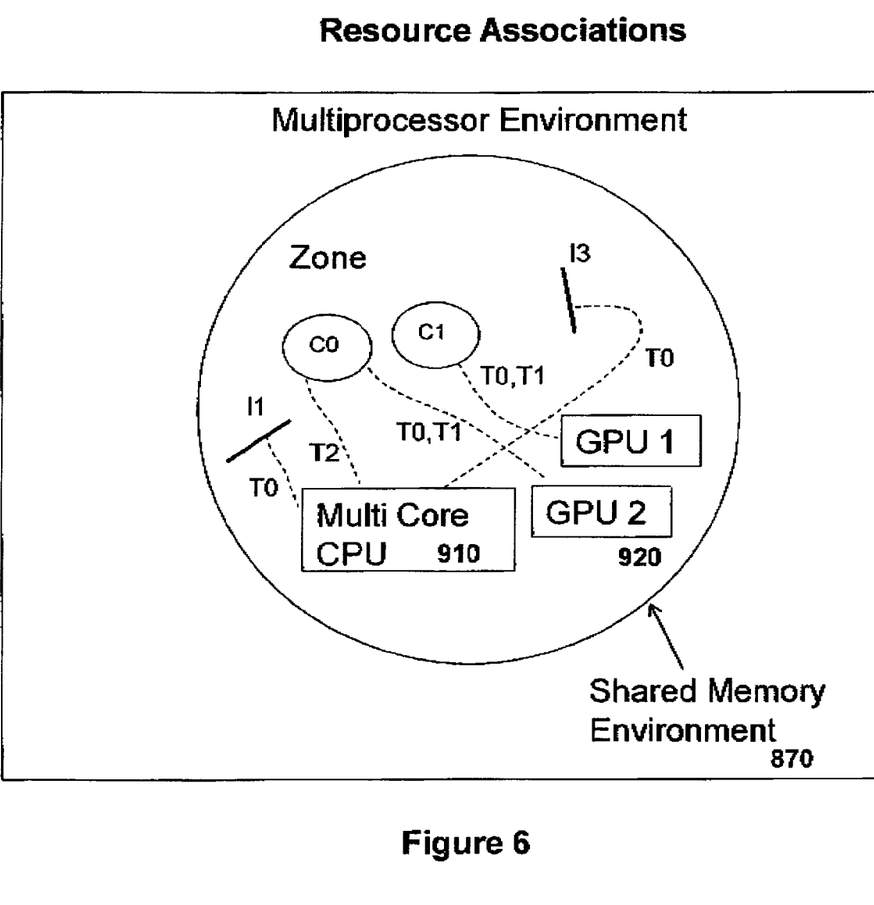
FIG. 6 depicts how Cell 130 and Interface 140 (and related Task 150) Objects are associated 860 to different processor architectures 910/920 available in the Multiprocessing Environment 300.

In FIGS. 5 and 6, the association 860 of Cell 130, Interface 140 and related Task 150 Objects to resources in a Multiprocessing Environment 300 is described in additional detail. In FIG. 5 the organization of an example Task Graph 400 is presented using Cells (shown with a capital C and number) and Interfaces (shown with a capital I and number). With distributed multiprocessor resources, the Cell, Interface and related Task Objects are collected into a Zone 160 (initially described in FIG. 2) and deployed collectively on a shared memory system 870. In FIG. 5 lines connecting Cell Objects through a common Interface Object indicate a communication path 880 within the Task Graph. Some communication paths are between Cell Objects 130 in the same shared memory system (such as C0-I3-C1) other communication paths involve two shared memory systems (such C3-I5-C6). Additionally a Cell may communicate with any number of other Cell Objects through common Interface Objects. An example of this in FIG. 5 is C1 communicating with C0, C3 and C5 through I3, I2, and I4 respectively. It is also important to note that a Cell may communicate with another Cell Object over any number of Interface Objects, as for example the communication paths C5-I6-CG and C5-I8-C6. The Task Graph requires that additional associations 860 be made, within a shared memory environment, so that Cell and Interface with related Task Objects are deployed on appropriate processor architectures. This additional level of information is presented with FIG. 6.

The Multiprocessing Environment 300, possibly comprised of any number of distributed multiprocessor systems, may also involve different combinations of multiprocessor configurations and processor architectures. The architectures will be described as multi-core CPU or manycore (single or multi-) GPU to distinguish between two different architectures, but additional future processor architectures also apply under this framework. The allocation of Cell 130, Interface 140 and Task 150 Objects (collected under Zones 160 of which there has to be a minimum of one) utilizing the example Attribute Filters 800 in FIG. 4, results in associations to processors with different architectures. FIG. 6 show the associations as dashed lines, and give an example of Cell Objects (C0 and C1) and related Task Objects (shown as T0 and T1) associated with GPU1 and GPU2 respectively. Some Task Objects with related Cell Objects may also be associated (such as T2) with a CPU in which case all Tasks (T0, T1 and T2) must coordinate in accessing Nodes 760 (with assigned data items) in the Cell Object. In a similar manner in FIG. 6, Interfaces (I1 and I3) and related Task Objects (T0) are shown associated with CPUs but could have been associated with the GPU resources if the Attribute Filter 800 indicated a good match to this architecture. The associations match Attributes 170 with the computer architectures to promote optimal Problem 110 solutions. Communication paths 880 between Cell Objects are not shown in FIG. 6.

Figure 7:
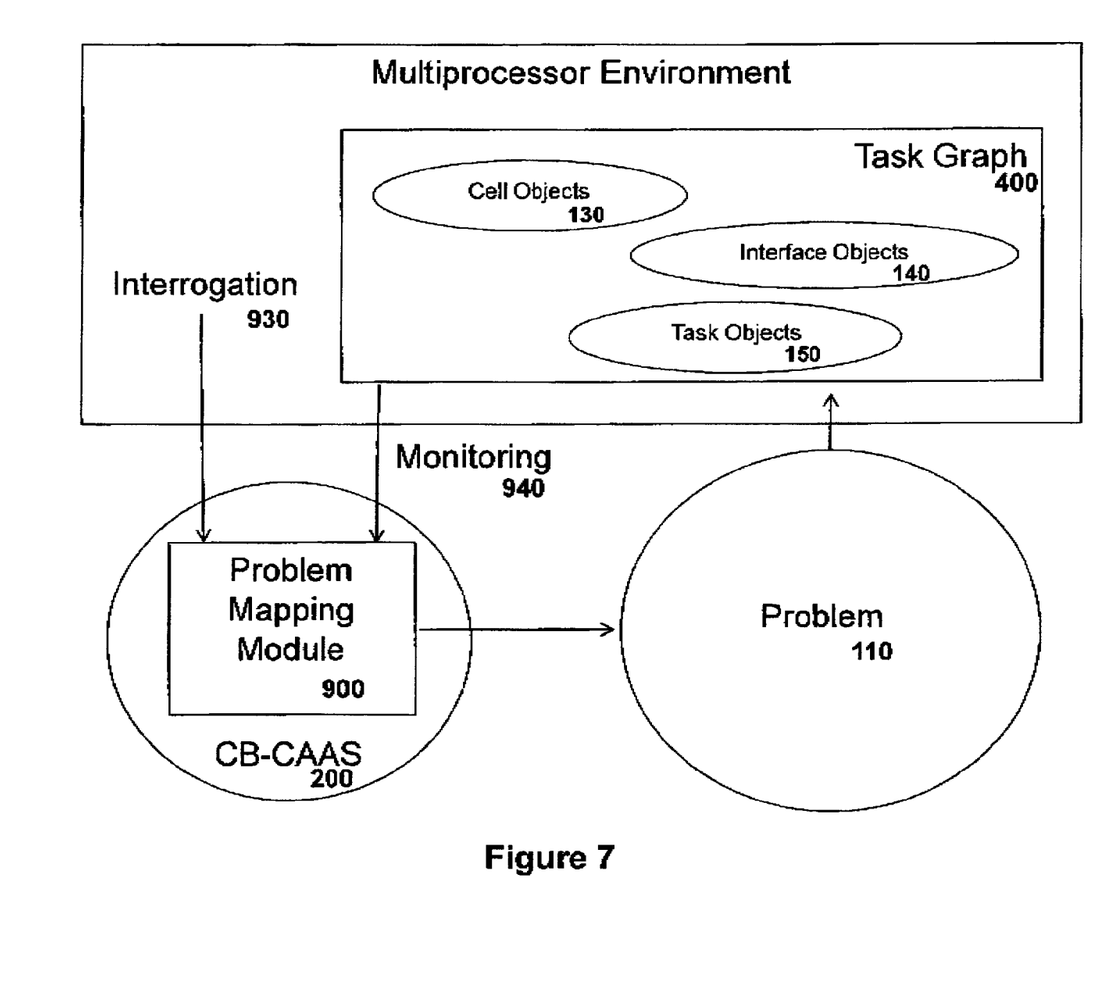
FIG. 7 depicts how Interrogation 930 of the Multiprocessing Environment 300 and Monitoring 940 of the Task Graph 400 is used in conjunction with known Problem 110 Attributes 170 and a Mapping Module 900, to improve the overall performance of the computer aided analysis according to one embodiment of the present invention.

In FIG. 7, a Mapping Module 900 is included as part of the CB-CAAS 200, and can Interrogate 930 the Multiprocessor Environment 300 for its available resources, as well as Monitor 940 the performance of the Problem 110 and its Task Graph 400. In FIG. 7, Interrogation is employed in the initial creation of the Task Graph, and Monitoring for improving the performance of the Task Graph in solving the Problem. Considering FIGS. 2 through 6, initial creation and performance improvement of the Task Graph can be made, for either case, in two steps. The first step involves estimating (at the start when the only available information is through Interrogation) or modifying the number of Cells 130, Interfaces 140 and related Task 150 Objects that make up a Zone 160 in order to obtain a better load balance over distributed multiprocessor resources. The second phase involves estimation or modification through the association 860 of Cell, interface and related Task Objects to available processors on a multiprocessor environment on the basis of Attribute 170 information.

Example Based on a Typical Computational Fluid Dynamics Application

The CB-CAAS 200 can be implemented for the application area of Computational Fluid Dynamics (CFD). The Input Source 100 loaded into the CB-CAAS, in the context of CFD, results in Cell Objects 130 having different Node 760 organizations (some structured 710 and others unstructured 720) and related Interface Objects 140 to handle, with related Task Objects 150, communication between Cells as well as differences in Nodal organization. Furthermore, Interface Objects are created to connect some Cell Objects to boundaries 750 where boundary conditions are applied for the solution of the governing differential equations. The Cell and Interface Objects combined fill in a discrete manner, using Nodes, a volume in space (this collection of Nodes is commonly called a mesh) in which a fluid flow field is to be predicted. Cell Objects connect to one another through Interface Objects, applied along common surfaces, and through which fluid can flow from one Cell to another. Several Levels 730/740 of Nodal information are created in each Cell and Interface Object, and may have different total number of Nodes (or Node Count 850) at each Level. The use of different Levels in the Problem Representation 600 is important to certain Task Objects, such as a matrix equation solver that operates on many levels of Node refinement (from fine to coarse typically), employed in the determination of the flow field. For CFD each Node has many data items, representing quantities such, as but not limited to, Cartesian coordinates (x, y and z), velocity components (u,v and w), pressure (p) and temperature (T).

The conservation (partial differential) equations governing fluid flow must be solved using data items at Nodes 760 and in turn generating new data items also stored at Nodes. Following established solution techniques in CFD a series of computational Tasks 150 are performed on the Cell 130 and Interface 140 Object data. Most generally these involve a series of Cell oriented Tasks such as (but not limited to): time-level initialization, discretization of governing equations, solution of equations with residual calculations and update of properties, etc. In addition, Interface oriented Tasks such as (but not limited to) application of boundary conditions, Interface linear equation coefficient adjustments, communication between cells during iteration, etc., are applied. In total a series of Cell and Interface Tasks are executed in resolving a time level, which is then repeated. If different time intervals (an interval is comprised of many successive time levels) are solved concurrently then Cell and related Task Objects can be duplicated to create new Cell and Task Objects with data items such as (but not limited to) Coordinate data (x,y, and z) remaining in common. Also, Interface and related Task Objects would also be duplicated, for different time intervals, to create new interface and Task Objects with information such as (but not limited to) Coordinate data remaining in common.

Cell Objects 130 have Attribute 170 information indicating a structured 710 or unstructured 720 Nodal 760 representation, as well as Node Count 850 information used in assessing computational 830 and data transfer 840 intensity. Interface Objects 140 have Attributes indicating (typically) synchronous communication at all Levels 730/740 between Cell Objects. Synchronous communication implies that the discretization of the governing equations has resulted in dependencies between Cells that must be maintained, through an Interface, during a time level evaluation. The Attributes are used, applying a filtering logic such as given in FIG. 4, to decide what Tasks 150 (and associated Cell and Interface Objects) should be deployed on which processor resource in the Multiprocessor Environment 309.

Discretization of a governing equation, such as (but not limited to) conservation of u-momentum, results in a linearized equation at each Node 760 that depends on itself and on neighboring Nodes. The linearized equation also depends on other conservation equations through its coefficients. For adequate resolution of the fluid flow field there may be any number of unique Nodes in a Cell 130 and an equal number of linearized equations are produced. A similar process occurs for other conservation equations such as (but not limited to) v-momentum, w-momentum, mass and energy. To solve the system of linearized equations, of which, in total, there can be billions of them in highly resolved fluid flow predictions, parallel processing is employed. In an example Multiprocessor Environment 300, processors based on CPU architectures 910 emphasize a Multiple Instruction Multiple Data (MIMD) level of parallelism. Other processors, such as those based on a GPU architecture 920, employ a Single Instruction Multiple Data (SIMD) level of parallelism. The MIMD and SIMD parallel processing approaches are matched (or associated 860) to the Tasks 150 operating on Cell and Interface 140 Objects based on a filtering logic given by FIG. 4. Generally SIMD parallelism has optimal performance when latency associated with data transfer to the processor can be hidden by the queuing of many thousands of threads operating on Nodes organized into large compact three-dimensional arrays representing structured data items. This can be very beneficial for regions of the flow field where a structured Node arrangement is used to improve accuracy, for example in Cells specifically aligned to follow the fluid flow along wall boundaries (which also can be described as resolving a boundary layer flow). Conversely, and generally speaking, unstructured data items with a relatively small number of Nodes may be best solved on a CPU using MIMD and taking advantage of larger and more flexible cache to hide the latency associated with irregular data transfer. Tasks connected to Interface Object data are usually always in this category (i.e. using CPU resources) in CFD applications since Interfaces use an unstructured data organization and have a much smaller number of Nodes relative to Cells.

Initial Interrogation 930 of the Multiprocessor Environment 300, combined with the Input Source 100 and CB-CAAS 200 producing a Problem Representation 600 (to which an Attribute Filter 800 is applied), allows the Mapping Module 900 to create an initial Task Graph 400. Subsequent Monitoring 940 of the solution performance between successive time levels in the CFD solution allows for adjustments to the Task Graph with a goal to balance the load between multiprocessor systems and to speed up the time level solution. For example, when processor resources are spread across distributed multiprocessor systems, the Cell 130 and Interface 140 Objects with related Task 150 Objects are collected under Zones 160 and associated with a particular multiprocessor system. The number of Objects bundled under a particular Zone can be adjusted for the next time level to affect load balancing, and furthermore, the Cell, Interface and Task associations 860 to processor architecture can be modified to seek a speed up in the time level solution.

Figure 8:
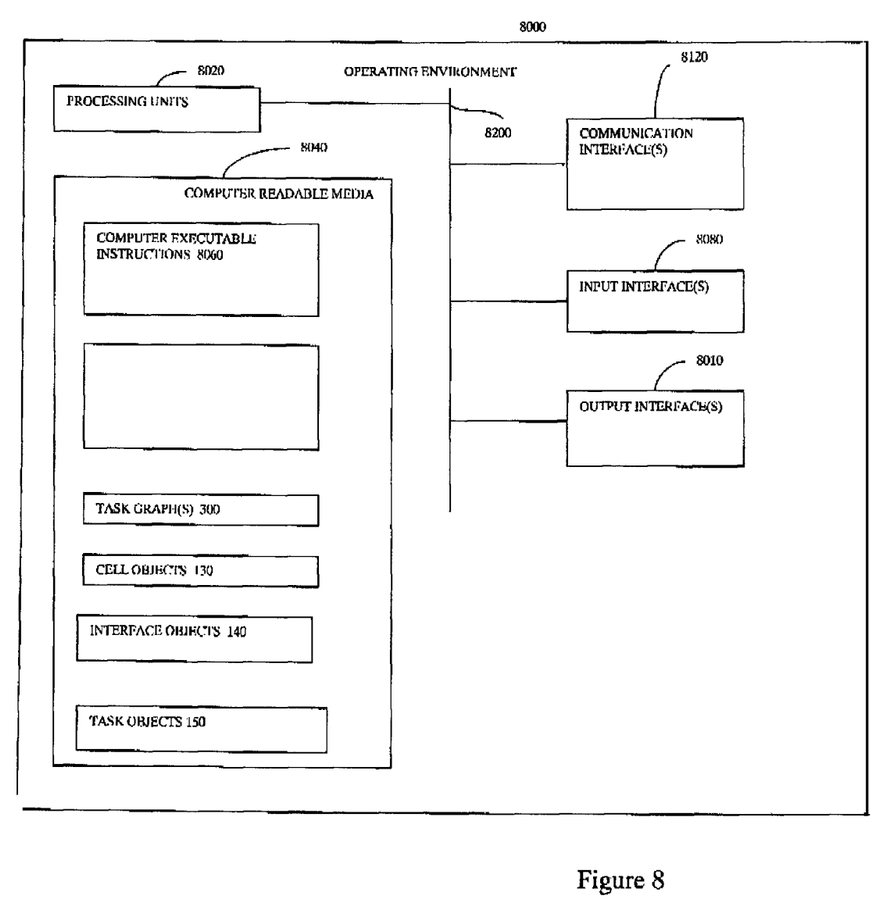
FIG. 8 depicts a simplified block diagram of an exemplary operating environment 8000 in which aspects of the multiprocessing computing environment(s), and/or the methods discussed herein may be implemented or used.

FIG. 8 is a simplified block diagram of an exemplary operating environment 8000 in which aspects of the Multiprocessor computing environment(s), and/or the methods discussed herein may be implemented or used. Operating environment 8000 is only one example of a suitable operating environment and is not intended to suggest any limitation as to the scope of use or functionality of the system(s) and methods described herein. For example, operating environment 8000 may be a type of computer, such as a personal computer, a workstation, a server, a portable device, a laptop, a tablet, or any other type of electronic device, such as a mobile phone, a personal digital assistant, a media player device; a set-top box device; a digital recording device; an in-vehicle device, or any hardware, software, or firmware aspect of the foregoing. Operating environment 8000 may also be a distributed computing network or a service, for example.

One or more communication media 8200, such as buses, may be used to carry data, addresses, messages, control signals, and other information within, to, or from operating environment 8000 and/or elements thereof. One or more processing units is/are responsive to computer-readable media 8040 and to computer-executable instructions 8060. Processing units 8020, which may be real or virtual processors, control functions of an electronic device by executing computer-executable instructions. Processing units 8020 may execute instructions at the assembly, compiled, or machine-level to perform a particular process. Such instructions may be created using source code or any other known computer program design tool.

Computer-readable media 8040 represent any number and combination of local or remote devices, in any form, now known or later developed, capable of recording, storing, or transmitting computer-readable data, such as the instructions executable by processing units 8020. In particular, computer-readable media 8040 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 8040 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 8060 represent any signal processing methods or stored instructions that electronically control predetermined operations on data. In general, computer-executable instructions 8060 are computer programs implemented as software components according to well-known practices for component-based software development, and encoded in computer-readable media (such as computer-readable media 8040). Computer programs may be combined or distributed in various ways. Systems according to the present invention may further include (not shown) a task graph creation and/or execution engine, responsible for creating and executing task graphs (including creating and deleting task objects and data objects), work item/queue and/or scheduling management, and managing thread loop operation. A computer-readable storage media may store items such task graphs 300, cell objects 130, interface objects 140 and task objects 150.

Functions/components described in the context of operating environment 8000 are not limited to implementation by any specific embodiments of computer programs. Rather, functions are processes that convey or transform data, and may generally be implemented by, or executed in, hardware, software, firmware, or any combination thereof, located at or accessed by, any combination of functional elements.

Input interface(s) 8080 provide input to operating environment 8000. Input may be collected using any type of now known or later-developed interface, such as a user interface. Examples of input interfaces include, but are not limited to, remote controls, displays, mice, pens, styluses, trackballs, keyboards, microphones, scanning devices, and all types of devices that are used input data.

Output interface(s) 8010 provide output from operating environment 8000. Examples of output interface(s) 8010 include, but are not limited to, displays, printers, speakers, drives, and the like.

Communication interface(s) 8120 are available to enhance the ability of operating environment 8000 to receive information from, or to transmit information to, another entity via a communication medium such as a channel signal, a data signal, or a computer-readable medium. Communication interface(s) 8120 may be, or may include, elements such as cable modems, data terminal equipment, media players, data storage devices, personal digital assistants, or any other device or component/combination thereof, along with associated network support devices and/or software or interfaces.

Various aspects of a parallel programming authoring and execution system and Multiprocessor computing environment therefore have been described. It will be understood, however, that all of the described aspects of the computing environment need not be used, nor must the aspects, when used, be present concurrently. Functions/components described herein as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

I claim:

1. A computer implemented method for assigning executable functions to available processors in a multiprocessor environment comprising a processing architecture selected from the group consisting of one or more CPUs, one or more GPUs and combinations thereof, the method comprising:
   providing an input source comprising instructions and data;
   breaking the input source into data oriented cell and interface objects with processing attributes;
   interrogating the processing architecture to ascertain available processor resources and creating a task graph based on available processor resources and the processing attributes of cell and interface objects;
   using the cell and interface processing attributes to assign the cell and interface objects to the processing architecture;
   carrying out the assigning step using the processing architecture and the cell and interface processing attributes to create the task graph;
   organizing the input source into a problem representation where the problem representation defines the relationships between the cell objects, interface objects (with associated processing attributes) and task objects;
   using the cell objects, interface objects (with associated processing attributes) and task objects in conjunction with information on the multiprocessing environment in the creation of the task graph;
   in the problem representation, using a directory structure to relate task objects to specific cell objects and interface objects and directing what computer instructions will operate on what data in the multiprocessing environment; and
   producing output data.

2. The method according to claim 1 comprising:
wherein the input source is a computer application for a problem to be solved and
adjusting the task graph using solution monitoring while solving the problem.

3. The method according to claim 1
wherein a zone defines a collection of cell objects, interface objects and task objects that operate within a common shared memory subset of the multiprocessing environment;
the step of creating the task graph comprising:
estimating through the interrogation or modifying the number of cell objects, interface objects and related task objects that make up a zone in order to obtain better load balance over distributed multiprocessor resources, and;
estimating or modifying through the association of cell objects, interface objects and related task objects that make up a zone.

4. The method according to claim 3 comprising:
assessing in a weighted manner the cell and interface objects and the related task objects for data item organization and size, task computational and data transfer intensity, and
associating the cell and interface objects and the related task objects to a specific resource in the multiprocessing environment.

5. The method according to claim 1 comprising:
collecting the cell, the interface and the related task objects to a zone and deploying the objects collectively on a shared memory system in the multiprocessing environment, and
allocating the objects using attribute filtering to processors with different architectures—associations match attributes with computer architectures to promote optimal problem solutions.

6. The method according to claim 1, wherein the data oriented cell objects and the interface objects represent a collection of nodes over which the problem can be solved and wherein the cells comprising structured and unstructured nodal representations.

7. The method according to claim 1 wherein the multiprocessing environment comprises:
processors selected from the group consisting of a single central processing unit, a multi-core central processing unit, a manycore single, a multi-graphics processing unit and combinations thereof.

* * * * *